United States Patent [19]

Kim

[11] Patent Number: 6,161,020
[45] Date of Patent: Dec. 12, 2000

[54] MOBILE RADIO TERMINAL WITH SMS FUNCTION FOR TRANSMITTING SHORT MESSAGE AND METHOD FOR CONTROLLING THE SAME

[75] Inventor: Jong-Joo Kim, Kyonggi-do, Rep. of Korea

[73] Assignee: Samsung Electronics Co., Ltd., Rep. of Korea

[21] Appl. No.: 09/174,949

[22] Filed: Oct. 19, 1998

[30] Foreign Application Priority Data

Oct. 18, 1997 [KR] Rep. of Korea ......................... 97-53651

[51] Int. Cl.$^7$ ...................................................... H04B 1/00
[52] U.S. Cl. ............................. 455/466; 455/412; 455/550
[58] Field of Search ...................................... 455/466, 412, 455/566, 575, 550, 414

[56] References Cited

U.S. PATENT DOCUMENTS 5,905,958  6/1999  Houde ........................................ 455/437
5,920,826  7/1999  Metso et al. ............................. 455/466

*Primary Examiner*—Edward F. Urban
*Assistant Examiner*—Congvan Tran
*Attorney, Agent, or Firm*—Dilworth & Barrese, LLP

[57] ABSTRACT

A mobile radio terminal with an SMS (short message service) function transmits a short message to different destination addresses by using a short message which was previouslytransmitted to a specified destination address. The mobile radio terminal includes a memory for storing a short message transmitted to a destination address, a user interface with which a user inputs menu display request and chooses a menu, a display and a controller for controlling the mobile radio terminal. The controller reads in sequence short messages from the memory in response to the menu display request, displays the read short messages on the display, reads a user selected short message from the memory when the user selects one of the short messages by using the user interface, and temporarily stores the selected short message in a buffer. Thereafter, the controller changes the destination address of the short message stored in the buffer to another destination address, transmits the short message to the another destination address, accesses the memory to read the short message, and updates transmission time data of the short message.

3 Claims, 2 Drawing Sheets

MOBILE RADIO TERMINAL WITH SMS FUNCTION FOR TRANSMITTING SHORT MESSAGE AND METHOD FOR CONTROLLING THE SAME

BACKGROUND OF THE INVENTION

1. Field of the Invention

The present invention relates to a short message service for a mobile radio terminal, and in particular, to a mobile radio terminal capable of transmitting a short message to different destination addresses and a method for controlling the same.

2. Description of the Related Art

A short message service (hereinafter, abbreviated as SMS) enables message communication between mobile radio terminals, or between a mobile radio terminal and a wired telephone. In the latter case, the short messages from a fixed communication network (e.g., a PSTN (Public Switched Telephone Network) or an ISDN (Integrated Services Digital Network)) are stored in a processing unit of a mobile communication network, converted to digital data and then transmitted to the mobile radio terminal.

A mobile radio terminal, such as a GSM (Global Systems for Mobile communication) phone, a CDMA (Code Division Multiple Access) phone and a PCS (Personal Communication Service) phone, has a memory including an outgoing message (OGM) box and an incoming message (ICM) box for storing the transmitted and received short messages. Specifically, the short message stored in the outgoing message box consists of a header field, a time stamp field, a destination number field, a user data field and a tail field.

Conventionally, the stored short messages are only maintained for the user's reference. Therefore, there is a demand for increasing the efficiency of the memory in the light of its application.

In some cases, the user may wish to transmit the same short message to several people. However, in conventional mobile radio terminals, the user must edit the short messages each time he wishes to transmit them, even if the contents of the short message are unchanged. This additional editing step, which is inconvenient and troublesome, may discourage the user of the mobile radio terminal from using the SMS feature.

SUMMARY OF THE INVENTION

It is therefore an object of the present invention to provide a mobile radio terminal with an SMS function for transmitting a short message to different destination addresses by using a short message which was previously transmitted to a specified destination address, and a method for controlling the same.

To achieve the above object, there is provided a mobile radio terminal with a short message service function for editing and transmitting a short message. The mobile radio terminal includes a memory for storing a short message transmitted to a destination address, a user interface with which a user inputs a menu display request and chooses a menu, a display and a controller for controlling the mobile radio terminal. The controller reads in sequence short messages from the memory in response to the menu display request, displays the read short messages on the display, reads a user selected short message from the memory when the user selects one of the short messages by using the user interface, and temporarily stores the selected short message in a buffer.

Thereafter, the controller changes the destination address of the short message stored in the buffer to another destination address, transmits the short message to the another destination address, accesses the memory to read the short message and updates transmission time data of the short message.

BRIEF DESCRIPTION OF THE DRAWINGS

The above objects and advantages of the present invention will become more apparent by describing in detail preferred embodiments thereof with reference to the attached drawings, in which.

DETAILED DESCRIPTION OF PREFERRED EMBODIMENTS

Figure 1:
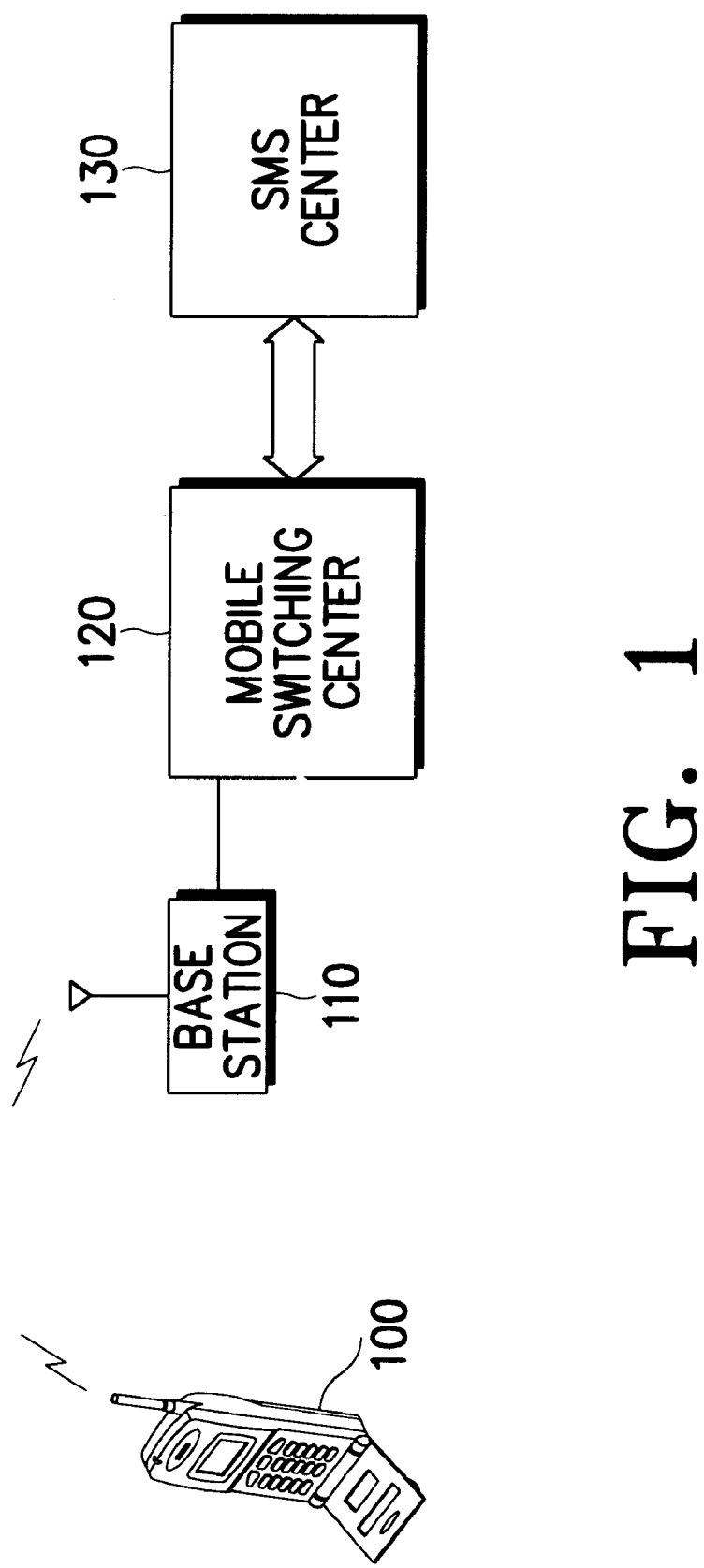
FIG. 1 is a block diagram of an SMS system for a mobile radio terminal to which the present invention is applied.

A preferred embodiment of the present invention will be described in detail hereinbelow with reference to the accompanying drawings in which the like reference numerals denote like or equivalent elements. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

FIG. 1 shows a block diagram of an SMS system for a mobile radio terminal to which the present invention is applied. Referring to FIG. 1, it is assumed that a mobile radio terminal 100 transmits a short message to a base station 110. A mobile switching center 120 acknowledges receipt of the short message to the mobile radio terminal 100 and transfers the received short message to another mobile radio terminal called by the mobile radio terminal 100. An SMS center 130, connected to other mobile switching centers (or the PSTNs and ISDNs), stores the short message received from the mobile switching center 120 and transfers it to another mobile switching center.

The mobile radio terminal 100 includes a memory (not shown) for storing a short message transmitted to a destination address, a user interface (not shown) with which the user inputs menu display request and chooses a menu, a display (not shown) and a controller (not shown) for controlling the overall operations of the mobile radio terminal. The controller reads, generally in sequence, short messages from the memory in response to the menu display request, displays the read short messages on the display, reads a user selected short message from the memory when the user selects one of the short messages by using the user interface and temporarily stores the selected short message in a buffer.

Figure 2:
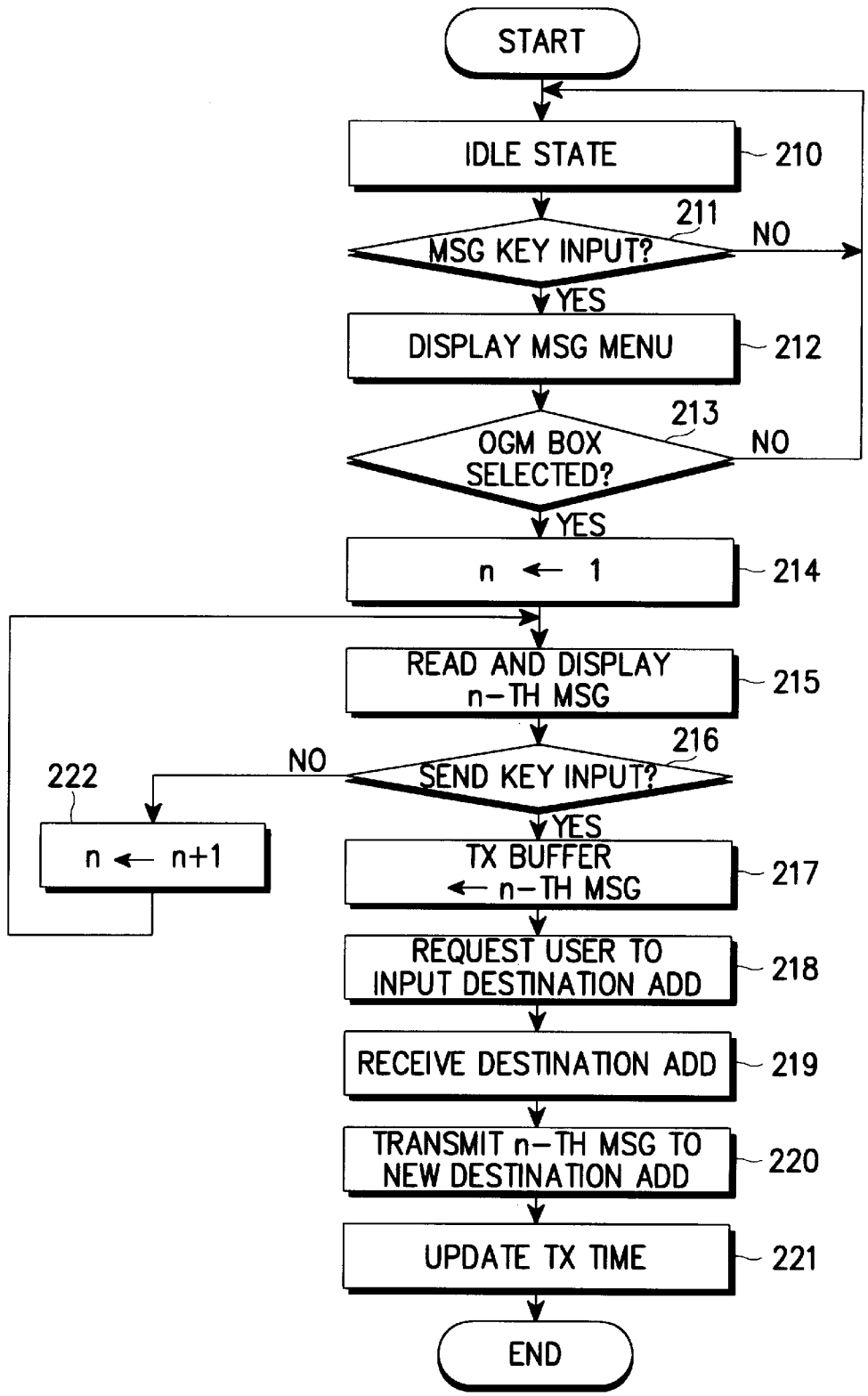
FIG. 2 is a flow chart illustrating a method for transmitting a short message according to an embodiment of the present invention.

FIG. 2 is a flow chart illustrating a method for transmitting a short message according to an embodiment of the present invention. Referring to FIG. 2, a controller of the mobile radio terminal 100 which is in an idle state in step 210 determines whether a message key is activated or not (step 211). If the message key is activated, the controller displays a message menu in letters on the display (step 212). The message menu may include a message transmission function, a message reception function, and so forth. Here, the transmission function may include a cellular paging transmission function and a cellular message transmission function.

After displaying the message menu, the controller of the mobile radio terminal 100 checks whether the user has selected the outgoing message box (step 213). If it is determined that the outgoing message box has not been selected, the controller returns to the idle state of step 210. On the contrary, if it is determined that the outgoing message box is selected by the user, the controller sets a variable (n) equal to 1 (step 214). Thereafter, the controller of the mobile radio terminal 100 accesses the memory to read n-th short message stored in the outgoing message box and display the message on the display (step 215). The controller then determines whether a transmission key (i.e., SEND key) is input through the user interface (step 216). When the transmission key is not input, the controller increments the variable n by one (step 222) and then returns to step 215 to read and display the next short message in memory.

If the transmission key is active in the step 216, the controller of the mobile radio terminal 100 accesses the outgoing message box of the memory to read the n-th short message and temporarily stores the message in a transmission buffer (step 217). Subsequently, the controller displays a message prompting the user to input a destination address (step 218). After that, if the destination address is input in step 219 through the user interface by the user, the controller replaces the original destination address of the n-th short message in the transmission buffer with the newly input destination address and transmits the above short message to the new destination address (step 220). As described above, since the short message stored in the outgoing message box of the memory consists of the header field, the time stamp field, the destination number field, the user data field and the tail field, it is possible to transmit the short message to another destination by simply changing the destination number field.

After transmitting the short message, the controller accesses the outgoing message box of the memory and updates the transmission time stamp data of n-th short message to the above transmission time in step 221.

As described above, the mobile radio terminal can transmit the short message by using the previously stored short message, when it is necessary to transmit the same short message to another destination address, thereby enhancing the operation of the SMS feature to the user.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile radio terminal with a short message service function for editing and transmitting a short message, comprising:

a memory for storing a short message transmitted to a destination address;

a user interface with which a user inputs a menu display request and chooses a menu;

a display; and a controller for reading in sequence short messages from said memory in response to said menu display request, displaying said read short messages on the display, reading a user selected short message from the memory when the user selects one of the short messages by using the user interface, temporarily storing said selected short message in a buffer, changing said destination address of the short message stored in the buffer to another destination address, transmitting said short message to said another destination address, accessing said memory to read said short message, updating transmission time data of said short message, and requesting a user selected response to transmit said short message to a further destination address.

2. A mobile radio terminal with a short message service function for editing and transmitting a short message, comprising:

means for storing a plurality of short messages;

means for determining whether a message function is selected;

means for displaying a message menu including an outgoing message box;

means for determining whether said outgoing message box is selected from the message menu displayed;

means for reading the short message from the storage means;

means for displaying the read short message;

control means for checking whether a user selects one of the short messages, prompting the user to input another destination address, reading said selected short message from the storage means upon receipt of the another destination address, changing the destination address of the said short message to said another destination address, and transmitting said short message to said another destination address;

means for updating transmission time data of said short message, after transmitting said short message to said another destination address; and means for requesting a user selected response to transmit said short message to a further destination address.

3. A method for transmitting a short message in a mobile radio terminal including a memory for storing short messages, comprising the steps of:

checking whether a message function is selected;

displaying a message menu including an outgoing message box, when the message function is selected;

checking whether said outgoing message box is selected from the message menu displayed;

if said outgoing message box is selected, reading the short messages from memory, displaying the read short messages and checking whether a user selects one of the short messages;

prompting the user to input another destination address, reading said selected short message from the memory upon receipt of the another destination address, changing the destination address of the said short message to said another destination address, and transmitting said short message to said another destination address;

accessing the memory to read said short message and updating transmission time data of said short message, after transmitting said short message to said another destination address; and requesting a user selected response to transmit said short message to a further destination address.

* * * * *